UNITED STATES PATENT OFFICE.

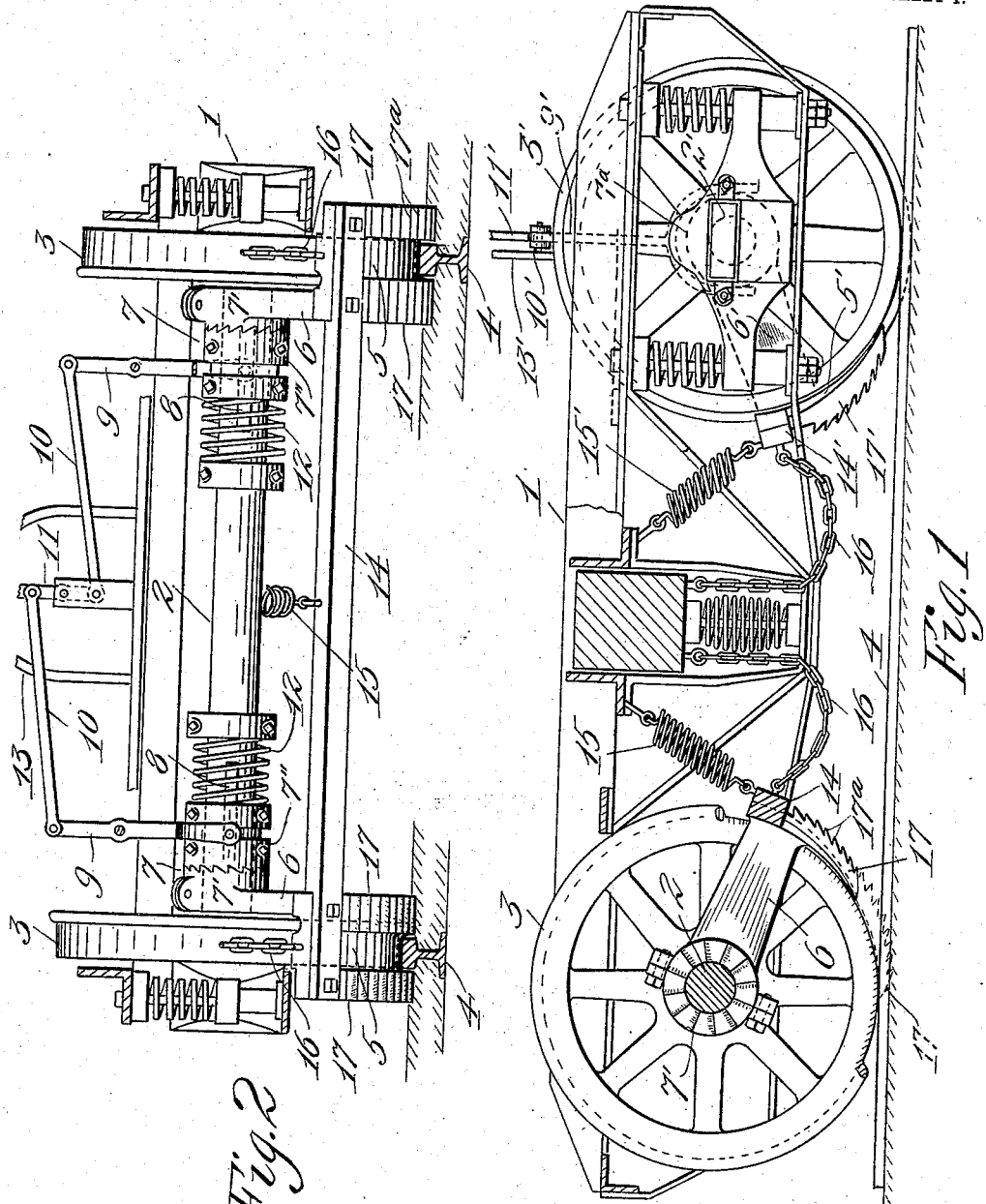

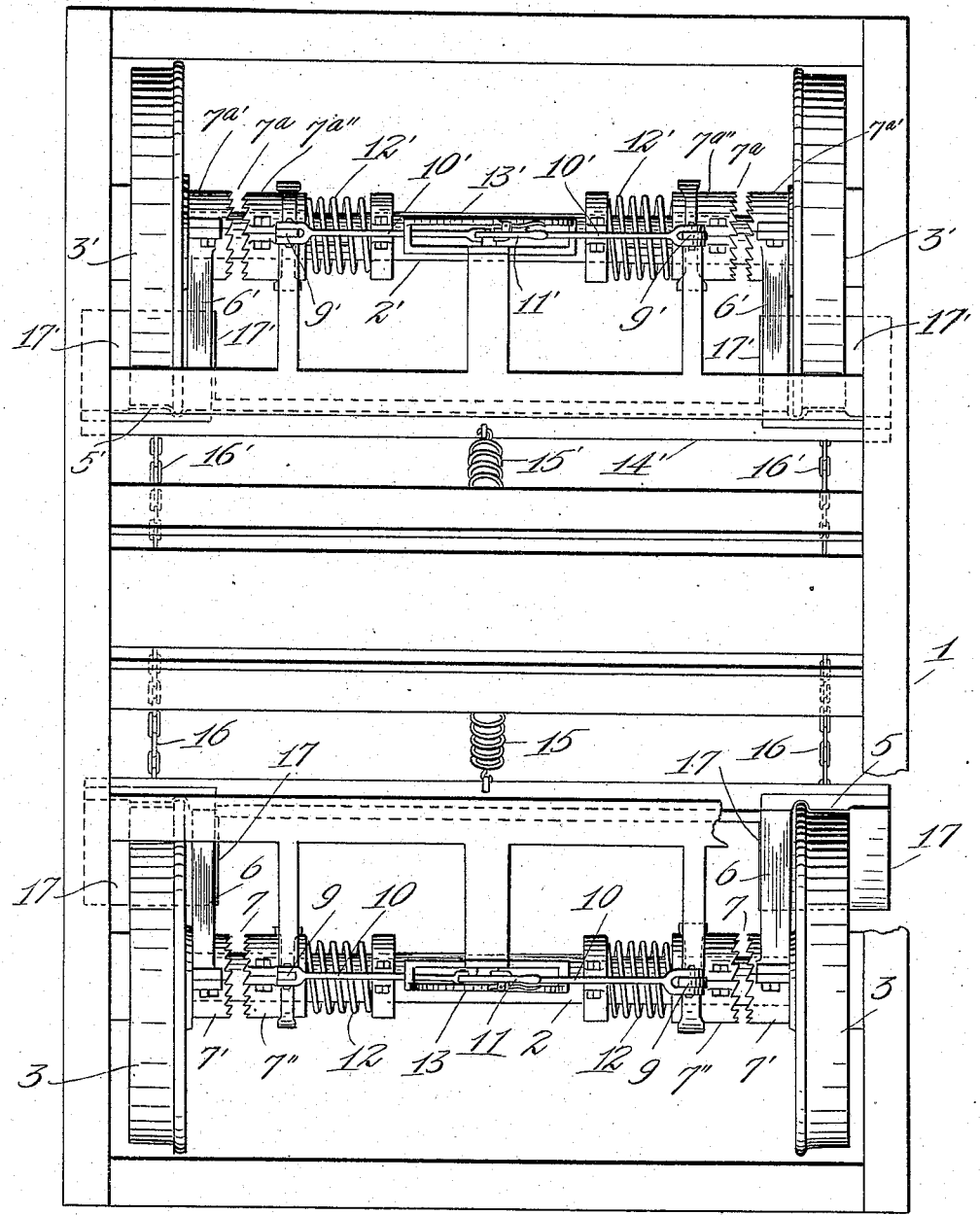

JAMES T. HOWELL, OF SEATTLE, WASHINGTON.

CAR-STOP.

No. 911,501.     Specification of Letters Patent.     Patented Feb. 2, 1909.

Application filed December 18, 1907. Serial No. 407,062.

*To all whom it may concern:*

Be it known that I, JAMES T. HOWELL, a citizen of the United States of America, and a resident of the city of Seattle, in the county of King and State of Washington, have invented certain new and useful Improvements in Car-Stops, of which the following is a specification.

My invention aims primarily to provide efficient brake mechanism for stopping cars.

A further object is to provide improved mechanism, particularly adapted for use on cable and electric cars, but not being limited thereto, by which cars traveling in either direction can be stopped on steep grades.

A further object resides in the provision of novel brake mechanism, the brake shoes of which are applied by movement of the car.

A further object is to provide brake means which embodies one or more track shoes with which are combined to operate in unison therewith suitable means which exerts a braking action by engaging the road bed.

With the above and other objects in view, to be referred to as the description progresses, the invention resides in the features of construction, parts, arrangement and combinations of parts hereinafter described and succinctly defined in the appended claims.

Referring now to the accompanying drawings in which like numerals of reference indicate like parts throughout the several views: Figure 1 is a side view of a car truck, partly in section, equipped with brake mechanism constructed in accordance with my invention, the brake shoes being shown as being elevated, and showing by dotted lines applied as in braking position. Fig. 2 is a vertical section taken through the car truck and showing the forward brake shoes lowered, and Fig. 3 is a view in top plan of the truck, with the clutches of the respective brake mechanisms shown in open position, a portion of the car truck being broken away.

Referring now to the drawings by numerals of reference, 1 indicates a car truck which may be of any desired construction, 2, 2' the front and rear axles respectively, and 3, 3' wheels fixed to said axles and arranged to roll on the track rails 4.

Reference numeral 5 indicates suitable track shoes supported by rigid arms 6 to the rear of wheels 3, for swinging to and from the underlying track rails. As now considered, arms 6 are fixed to loose clutch members 7' of suitable clutches 7, arranged on axle 2.

Reference numeral 7'' indicates the other members of clutches 7, the same being secured to movement with axle 2 by suitable splines 8 and being slidable on said axle toward and from the member 7'. Clutch members 7', 7'' are provided on their contiguous faces with ratchet teeth, as clearly illustrated.

Connected with clutch members 7'' are levers 9, which levers are connected by links 10 to a single operating lever 11, through the medium of which the clutch members 7'' can be simultaneously disengaged from clutch members 7'. Springs 12, force clutch members 7'' into engagement with clutch members 7', when lever 11 is released, as from a toothed segment 13.

Track shoes 5 are preferably connected by a brake beam 14, and are normally held elevated by suitable means, consisting of a spring 15.

In operation the parts are normally arranged as shown in Fig. 1, but upon approaching a steep grade, lever 11 can, if desired be released so that the ratchet devices will be set to operate upon backward movement of the car. While the car travels forward up the grade the teeth of clutch members 7'' ride over the teeth of clutch members 7', and the shoes will obviously not be applied. Should, however, the car start to go backward, the clutches will operate to swing the shoes downwardly into engagement with rails 4 and beneath the wheels 2, as indicated by dotted lines in Fig. 1, until the movement of said shoes is limited by chains 16.

On each track shoe 5, are suitable depending guard means in the form of brake shoes 17, which are adapted to project on opposite sides of the rail engaged by the track shoe and engage the road bed (see Fig. 2) the lower faces of said shoes 17 being preferably provided with suitable projections, as teeth 17$^a$, designed to catch in the road bed and thereby materially assist shoes 5 in stopping the car. In addition to this braking mechanism for preventing backward movement of the car, I also provide the car with suitable braking mechanism for stopping the same when moving in a forward direction, this mechanism comprising track shoes 5', provided with road bed shoes 17', constructed in a manner similar to shoes 5 and 17. Track shoes 5' are arranged in advance of wheels 3' and are secured to rigid arms 6', fixed to loose clutch members 7ᵃ' of clutches 7ᵃ, arranged on axle 2'. Reference numeral 7ᵃ'' indicates the other clutch members of the clutches 7ᵃ, the same being secured to move with axle 2', but being supported for sliding thereon in the same manner as clutch members 7''. The component members of clutches 7ᵃ are also provided on their contiguous faces with ratchet teeth. These ratchet teeth are however, set in a relatively reverse manner to those of clutches 7 so that brake shoes 5' will be applied by forward movement of the car, as will be readily understood.

Reference numeral 9' indicates levers connected to clutch members 7ᵃ''', and being connected by links 10' to an operating lever 11' which is normally engaged with a suitably toothed segment 13' for preventing springs 12' closing the clutches.

A spring 15' engaged with brake beam 14' normally holds shoes 5' elevated. Shoes 5' like shoes 5 are adapted to be moved beneath the adjacent wheels of the car, see dotted position in Fig. 1, and their movement is limited by suitable chains 16'.

When it is desired to apply the braking mechanism just described, operating lever 11' is released whereupon, clutches 7ᵃ will be closed and shoe 5' swung downwardly by movement of the car onto the rails beneath the wheels 3'.

The mechanism described and shown in the drawings, illustrate one embodiment of my invention which will operate in an efficient manner, I do not wish to be understood however, as limiting myself to this form of my invention.

Having thus fully described my invention, what I claim as new and desire to secure by Letters Patent of the United States, is:

1. In combination with a car and the track, a brake shoe swingingly supported on an axle of said car, and means to connect said brake shoe with said axle whereby they will move in unison.

2. In combination with an axle of the car, means swingingly supported on said axle, a shoe carried by said means, and means for connecting said first means in fixed relation to said axle, for the purpose specified.

3. In combination with an axle of the car, a clutch thereon comprising two members one of which is normally loose on said axle, and a brake shoe connected to said normally loose clutch member for rotation therewith.

4. In combination with an axle of the car, a clutch arranged to be driven by said axle and comprising two members one of which is normally loose, an arm fixed to said normally loose clutch member, and a brake shoe carried by said arm.

5. In combination with the track and the car, independent brake means supported on said car and being connected to be applied one by forward movement of said car and the other by backward movement of said car, and means for holding the former of said brake means normally out of operation.

6. In combination with the track and a wheel and axle of the car, a clutch comprising a member arranged to rotate on said axle and a second member connected to rotate with said axle and being supported for movement toward and from said first member, said clutch members being provided on their contiguous faces with teeth, a shoe connected to be moved by first named clutch member into engagement with the rail, and means for throwing said second named clutch member out of engagement with the other.

7. In combination with the track and a wheel and axle of the car, a clutch comprising a member supported for rotation, and a second member supported for movement toward and from said first member and being connected to rotate with said axle, said clutch members being provided on their contiguous faces with ratchet teeth, a shoe connected to be moved by said first named clutch member into engagement with the rail, and means yieldingly pressing said second named clutch member toward said first named clutch member.

8. In combination with the track and a wheel and axle of the car, a clutch comprising a member supported on said axle for rotation and a second member connected to rotate with said axle and being slidable thereon, said clutch members being provided on their contiguous faces with teeth, a track shoe, a rigid connection between said shoe and said first named clutch member, means yieldingly pressing said slidable clutch member toward the other, and means to normally hold said slidable clutch member from the other.

9. In combination with the track and a wheel and axle of the car, a clutch comprising a member supported for rotation and a second member supported for movement toward and from said first member and being connected to rotate with said axle, said clutch members being provided on their contiguous faces with teeth, a shoe connected to be moved by said last named clutch member into engagement with the rail, means to move said last named clutch member toward and from said first named clutch member, and means to limit the movement of said shoe when it has moved beneath said wheel.

10. In a brake for cars, a track shoe provided with depending relatively fixed means arranged to project below the tread of a rail of the track for engagement with the road bed.

11. In combination with a track and a car, a brake mechanism for said car including a track shoe and road bed shoes connected for simultaneous operation, said road bed shoes having their lower faces provided with teeth.

Signed at Seattle, Washington this 7th day of December 1907.

JAMES T. HOWELL.

Witnesses:
 FRANK E. ADAMS,
 STEPHEN A. BROOKS.